March 24, 1964 L. C. H. JUY 3,125,894
DERAILER CHANGE-SPEED FOR MECHANISMS FOR CYCLES
Filed June 22, 1960 4 Sheets-Sheet 1
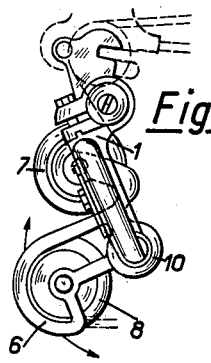
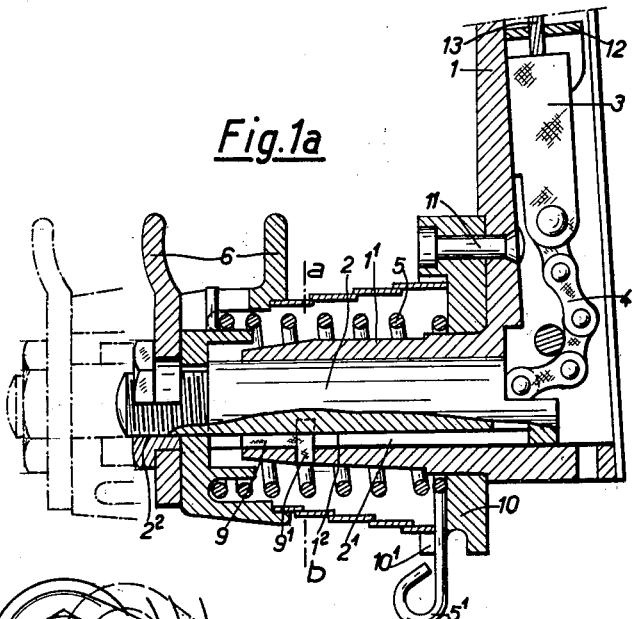
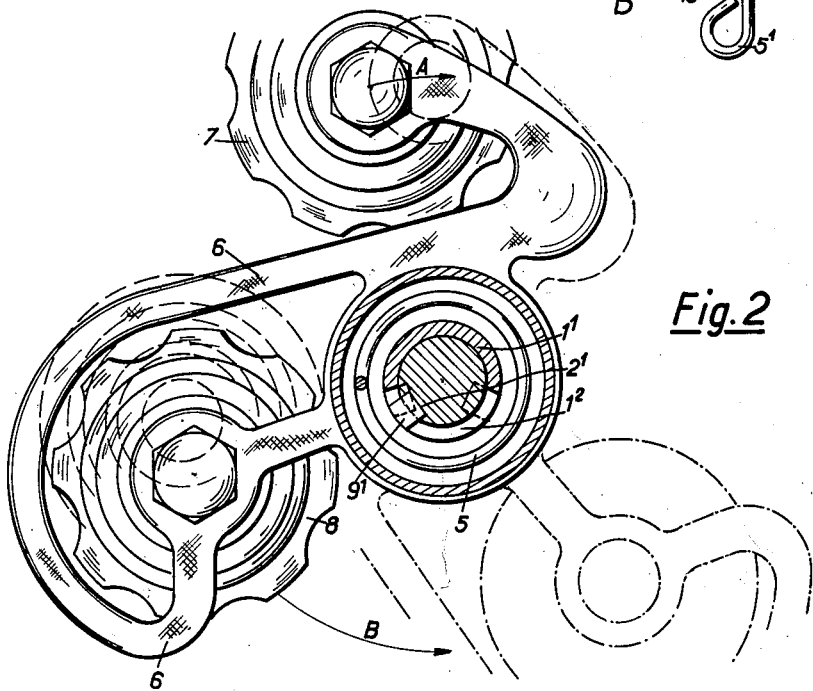

March 24, 1964 L. C. H. JUY 3,125,894
DERAILER CHANGE-SPEED FOR MECHANISMS FOR CYCLES
Filed June 22, 1960 4 Sheets-Sheet 2
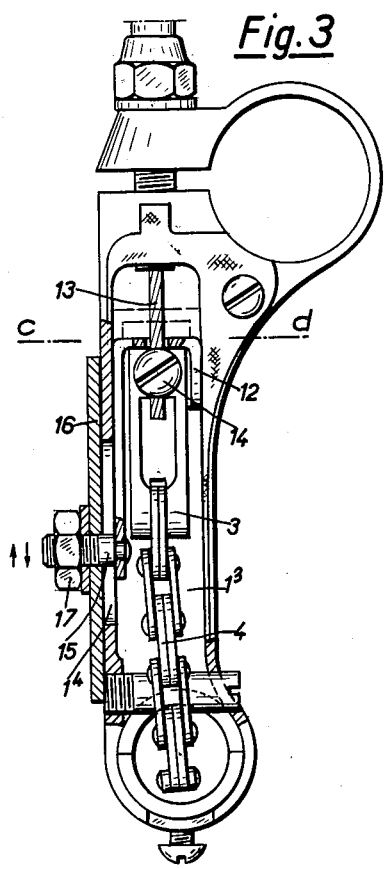
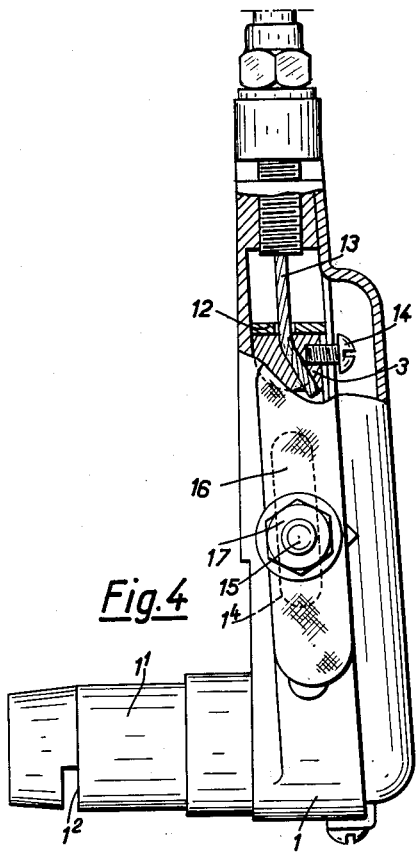
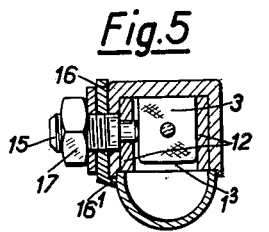
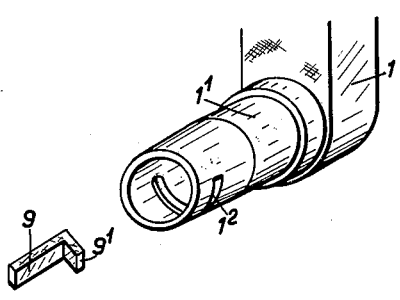

March 24, 1964  L. C. H. JUY  3,125,894
DERAILER CHANGE-SPEED FOR MECHANISMS FOR CYCLES
Filed June 22, 1960  4 Sheets-Sheet 3
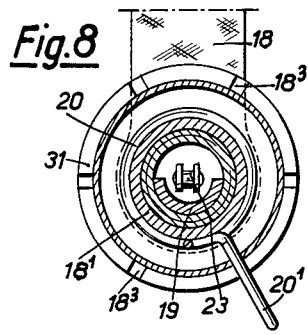
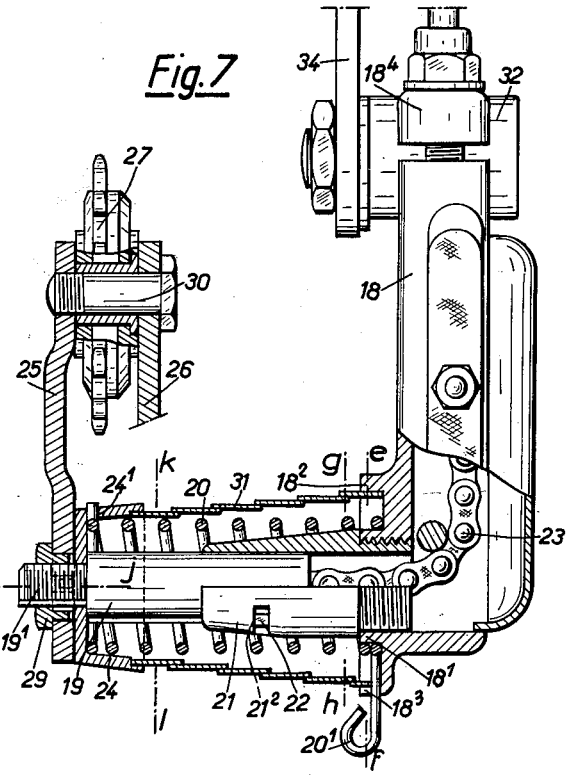
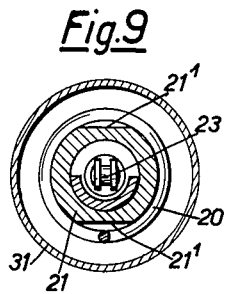
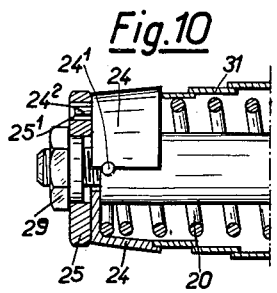
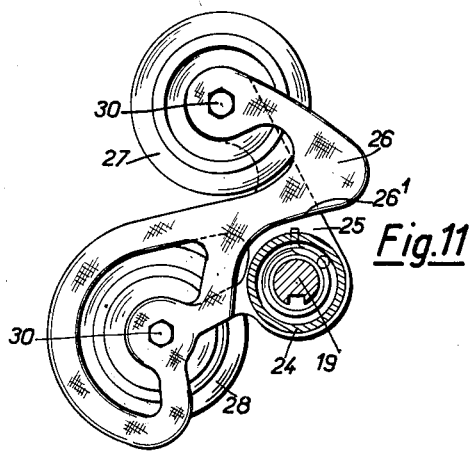

March 24, 1964 L. C. H. JUY 3,125,894
DERAILER CHANGE-SPEED FOR MECHANISMS FOR CYCLES
Filed June 22, 1960 4 Sheets-Sheet 4
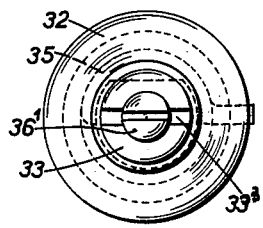
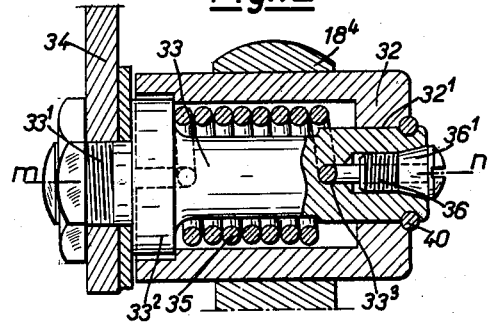
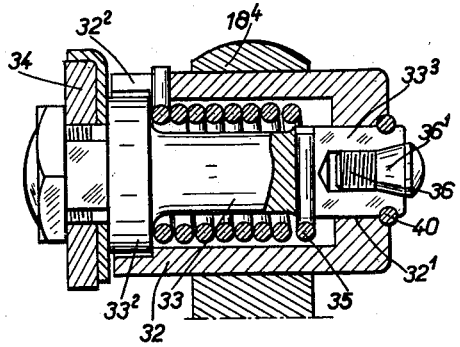
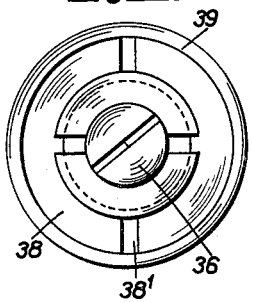
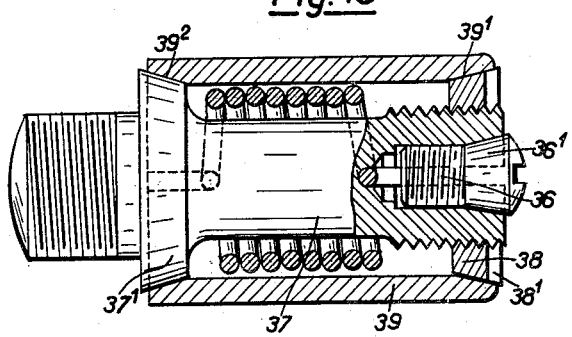

United States Patent Office 3,125,894
Patented Mar. 24, 1964

3,125,894
DERAILER CHANGE-SPEED FOR
MECHANISMS FOR CYCLES
Lucien Charles Hippolyte Juy, 75 Rue General-Fauconnet,
Dijon (Cote d'Or), France
Filed June 22, 1960, Ser. No. 38,015
Claims priority, application France July 2, 1959
4 Claims. (Cl. 74—473)

This invention relates to a change-speed gear mechanism.

Applicant's British patent specification No. 785,531 discloses a change-speed gear mechanism by displacement of the chain for cycles or the like vehicles acting by chain displacement, which mechanism comprises a recessed one-piece carrier lever the upper part of which is so shaped as to be capable of rotating freely on a spindle or pivot carried on a supporting lug of the change-speed gear mechanism, the said supporting lug being fitted or permanently secured on the rear lug of the frame of the cycle or similar vehicle and the said carrier lever being mounted on its pivot in a manner permitting the adjustment of its transverse position on the said pivot, a resilient spring means being interposed between the support lug and the carrier lever in such manner as to exert on the said lever a continuous thrust causing a pivoting movement in the clockwise direction, the cable controlling the speed-change being secured at its end to a sliding coupling member disposed slidingly in the recess in the carrier lever, a chain or other means of transmission being secured on the one hand to the said sliding coupling member and on the other hand, after passing over a roller or other deflecting point, to a reciprocating spindle which may be made telescopic through the agency of one or more sliding members, in a bearing recess formed in the carrier lever substantially parallel to itself, the said reciprocating spindle carrying one or more roller-bearing cheeks, the cheek nearest to the carrier lever being punched or stamped for the passage of the reciprocating spindle, depending on whether the said cheek is simply secured on the other cheek or whether it forms a stamped dished member juxtaposed with the second cheek and secured on the end of the reciprocating spindle, a coil spring subjected to compression and torsion being mounted in compression between the cheeks, making use of the space between the two cheeks, and the carrier lever, one end of the said spring being secured to the cheeks and the other end being secured in such manner that it is angularly adjustable either automatically or by hand, arrangements being provided for limiting the amplitude of displacement of the reciprocating spindle carrying the cheeks and rollers, and a plate casing secured on the carrier lever covering the mechanism disposed in the said lever.

The change-speed device forming the subject of the present invention relates to arrangements in respect of the adjustment of the travel of the telescopic reciprocating system, depending on whether it is used for three, four or five speeds, and it relates also to means limiting the rotation of the reciprocating spindle by forming forward and rearward abutments which, in one direciton, facilitate the disassembly and re-assembly of the rear wheel and, in the other direction, limit the chain tension.

The present invention is also concerned with arrangements relating to the design of the carrier lever, the design and assembly of the carrier system on the articulation and pivoting spindle, and a device for taking up play of the articulation spindle for the change-speed gear mechanism on the supporting lug secured on the rear fork of the cycle.

For a better understanding of the invention and to show how the same may be carried into effect, one embodiment thereof will now be described with reference to the accompanying drawings in which:

FIGURE 1 shows, drawn on a reduced scale, a diagrammatic assembly view of a change-speed gear mechanism according to the invention;

FIGURE 1a is a sectional view of a detail of FIGURE 1. The broken lines illustrate the displacement of the end of a reciprocating part;

FIGURE 2 is a cross-section taken along the line a—b of FIGURE 1a. The broken lines illustrate the maximum pivoting of the roller-carrying cheeks (seen in FIGURE 1), whereas the dot-dash lines illustrate the opposite pivoting movement thereof into the abutment position, to permit the de-tensioning of the chain and the disassembly or re-assembly of the wheel;

FIGURE 3 is a lateral view in partial section of the carrier lever fitted with the device for adjusting the travel of the reciprocating spindle;

FIGURE 4 is a bent-over projection, partially in section, and corresponding to FIGURE 3;

FIGURE 5 is a view in plan and in section along the line c—d of FIGURE 3;

FIGURE 6 is a perspective view showing the separate members of the double-abutment device;

FIGURE 7 is a view in partial section of another change-speed gear mechanism according to the invention;

FIGURE 8 is a cross-section taken along the line e—f of FIGURE 7;

FIGURE 9 is a cross-section taken along the line g—h of FIGURE 7;

FIGURE 10 is a part-sectional view along the line i—j of FIGURE 7, the dished member being shown as an external half-view;

FIGURE 11 is a lateral view in section along the line k—l of FIGURE 7;

FIGURE 12 is an axial section, drawn to a larger scale, of the pivoting spindle support of the change-speed gear mechanism, with a play-take up device;

FIGURE 13 is a lateral view corresponding to FIGURE 12;

FIGURE 14 is a view in plan and in axial section along the line m—n of FIGURE 12;

FIGURE 15 is an axial section through the articulation spindle support with the play take-up device according to a second embodiment;

FIGURE 16 is a lateral view corresponding to that of FIGURE 15.

The illustrated derailleur change-speed gear mechanism comprises a carrier lever 1 which is prolonged perpendicularly to its base by a sleeve-like bearing 1¹ to receive slidingly a shouldered spindle 2 which can reciprocate under the control of a carriage 3 and a chain 4 and which, on the other hand, is able to rotate under the circular tension force exerted by a coil spring 5 which tends to push it away while simultaneously spacing it from the carrier lever 1. The spindle 2 is fast at its end with a cheek 6 carrying rollers 7 and 8, as described and illustrated in applicant's British patent specification 785,531.

The spindle 2 is formed with a longitudinal groove 2¹ in which slides freely a flat key 9 having a square head 9¹. A slot 1² having the form of a circular sector in the bearing 1¹ permits the engagement of the square head 9¹ of the key 9 and also the free sliding thereof in accordance with a pre-determined degree of angular displacement.

Due to this arrangement, it will be apparent that the flat key 9, which is longitudinally maintained by its head 9¹ disposed in the slot 1², permits, due to its sliding in the groove 2¹, the free longitudinal displacement of the shouldered spindle 2 for the control of the reciprocating movement of the cheek 6.

On the other hand, during its angular displacement, the spindle 2 entrains, by means of its groove $2^1$, the flat key 9 slidingly guided by its head $9^1$ in the slot $1^2$.

Consequently, in the two directions of rotation, the head $9^1$ (and consequently also the spindle 2) have an angular displacement determined in correspondence with the dimension of the slot $1^2$. At the end of travel, the head $9^1$ of the key abuts against one or the other of the ends of the slot $1^2$, thus limiting the pivoting amplitude of the spindle 2 and consequently of the cheeks 6 carrying the rollers 7 and 8.

Taking into account the precise circular positioning of the cheeks 6 on the spindle 2, by reason of a flat portion $2^2$ prolonging the groove $2^1$, the rearward abutment position illustrated by the arrow A shown in FIGURE 2 permits the rotary assembly carrying the rollers 7 and 8 to limit the maximum tension of the chain and not to exceed a predetermined position shown in broken lines.

The forward abutment position illustrated in dot-dash lines and by the arrow B in FIGURE 2, permits the maximum opposite pivoting movement for completely detensioning the chain and easily permitting the disassembly or re-assembly of the rear wheel of the cycle.

A pulley 10, centered on a shoulder of the bearing $1^1$ of the carrier lever 1, may be either rotary and controlled by a cable permitting the obtaining of constant chain tension at a distance, or it may be fixed and coupled to the carrier lever 1 by a rivet 11 or by any other means. In this latter case, as is illustrated in FIGURE 1a, the adjustment of the circular tension of the coil spring 5 is effected solely by its projecting end $5^1$ which is engaged in one of a plurality of notches $10^1$ radially formed in the collar of the pulley 10.

The adjustment of the longitudinal travel of the spindle 2 in accordance with the number of speeds which it is desired to utilise is obtained by means of a plate abutment 12 disposed in the recess or cavity $1^3$ of the carrier lever 1, above the member 3.

It is noted that the cavity $1^3$ serves as a seating for the sliding coupling member 3 secured to the control cable 13 by a screw 14 and coupled at its base to the chain 4 directly driving the spindle 2. The member 3 is displaced over a given path to permit the sliding of the reciprocating assembly integral with the rollers 7 and 8.

The plate abutment 12 which is of U-shape having unequal limbs is made fast with a spindle 15 passing through a guide slot $1^4$ formed in the thickness of the carrier lever 1. A locking plate 16 having a setting $16^1$ bears on the outer face of the carrier lever 1 and serves as a support means for a nut 17 screwed on the end of the spindle 15. Due to this arrangement, the unlocking of the nut 17 permits the free sliding of the plate 16 and of the plate abutment 12 over a path corresponding to the length of the guide slot $1^4$.

During the adjustment of the change-speed gear mechanism for adaptation thereof to a cycle the freewheel of which has any desired number of pinions, the user acts on the cable control for controlling the spindle 2 and placing the chain on the small pinion of the freewheel. After this manipulation, the sliding coupling member 3 occupies a specific position in the seating $1^3$ and it then suffices to unlock the nut 17 so as to bring the plate abutment 12 into contact against the upper face of the said member. After being locked in the abutment position, the plate 12 limits the travel of the sliding coupling member 3 while permitting, in the opposite direction, the free displacement of the spindle 2. The adjustment of travel is extremely simple and it may operate within a wide range corresponding to all kinds of freewheels, equally well with wide or narrow freewheels.

In an embodiment illustrated in FIGURES 7 to 11, the carrier 18 has at its base a cylindrical and perpendicular bearing surface $18^1$ coaxially surrounding reciprocating spindle 19.

An outer concentric collar $18^2$ is formed radially with notches $18^3$ wherein the radial portion $20^1$ of the coil spring 20 is engaged in an adjustable manner.

Centered in the circular chamber formed between the bearing surface $18^1$ and the collar $18^2$, bears the forward end of the spring 20 and of a telescopic protecting spring 31.

Screwed into the recessed and screwthreaded bearing $18^1$ is a shouldered ring 21 centered and slidingly guided in which is the reciprocating spindle 19. Two opposite flats $21^1$ formed externally on the control profile of the ring 21 permit the engagement of a locking key.

The ring 21 has, as previously described, the sector slot $21^2$ for guiding and limting the angular displacement of the head 22 of the key lodged in the groove in the reciprocating spindle 19.

The ring 21 may be secured on the carrier lever 18 by any other means and, for example, the ring 21 may be directly incorporated during the casting of the carrier lever 18.

The reciprocating spindle 19 is driven at its forward end by the chain 23 passing through the aperture in the carrier lever 18. The other end of the spindle 19 is provided with a screwthreaded bearing surface $19^1$ having a flat for receiving the stamped dished member 24. The rearward end of the spring 20 bears in the dished member 24. A radial aperture $24^1$ formed in the said dished member receives a radial portion of the said spring 20 in such manner as to fix the angular position thereof.

The cheeks 25 and 26, carrying the rollers 27 and 28, are independent and are produced separately by punching or any other means. The counter-cheek 25 is centered on the screwthreaded bearing $19^1$ and bears against the dished member 24. A stop means $24^2$ externally secured on the bottom of the dished member 24 is engaged in an aperture $25^1$ formed in the counter-cheek 25. In this way, the transverse coupling of the dished member 24 and the counter-cheek 25 is effected in accordance with a precise angular position.

A shouldered nut 29 screwed on the end of the spindle 19 longitudinally fixes the counter-cheek 25 and the dished member 24 with the spindle 19.

With this construction, the pivoting of the counter-cheek 25 entrains the dished member 24 and the reciprocating spindle 19, acting also circularly and in torsion on the double-action coil spring 20. (Circular action and action of axial expansion.)

The forward cheek 26 is coupled with the counter-cheek 25 through screws 30 passing axially through the rollers 27 and 28 rotating through the intermediary of ball bearings or friction rings. The forward cheek 26 is formed with a sector-shaped recess $26^1$ which surrounds the dished member 24 and the telescopic protection spring 31.

A play take-up device for the articulation pivot supporting the carrier lever 18 is illustrated in FIGURES 12, 13 and 14 which show a support casing 32 secured on the clamping collar $18^4$ formed on the upper portion of the carrier lever 18. Mounted in the said casing is an articulation pivot 33 the end of which is screwthreaded with flats $33^1$ for securing and positioning the lug 34.

The spindle 33 is centered in the casing 32 by a collar $33^2$ and its end is formed forwardly with a diametral slot $33^3$ wherein is engaged the cranked end of a coil spring 35. Screwed into a screwthreaded aperture formed axially in the slot $33^3$ is a screw 36 having a conical head $36^1$ of slight slope, which is centered in a corresponding milled aperture forming a seating at the end of the screwthreaded aperture.

If the screw 36 is locked, the spacing-apart is effected, through the intermediary of the conical head $36^1$, of the slotted end of the spindle 33, consequently achieving a slight degree of diametral extension permitting the adjustment of the circular play of the corresponding bearing $32^1$ of the casing 32. The latter is furthermore longitudinally positioned by an open resilient keeper ring 40 disposed in a groove at the end of the spindle 33.

The coil spring 35 has a further cranked end engaged in a slot 32² formed in the casing 32.

In a variant illustrated in FIGURES 15 and 16, it will be seen that the spindle 37 has, on the one side, a conical collar 37¹ centered in a corresponding conical bearing 39² in the casing 39. On the other side, the spindle 37 is externally screwthreaded to permit the screwing of a ring 38 which is externally conical for fitting into a corresponding bearing surface 39¹ formed at the open end of the casing 39. The ring 38 is also formed with a diametral slot 38¹ for the entrainment thereof.

During adjustment of the articulation, the ring 38 is screwed in such manner as to take up the play. The positioning and locking of the ring 38 are effected by the screw 36 the conical head 36¹ of which displaces the slotted end of the spindle 37 and locks the engaging threads. In this way, the ring 38 is made fast with the spindle 37.

I claim:

1. A change-speed gear mechanism of the type which is operable by chain displacement, said gear mechanism comprising: a carrier lever, said carrier lever including a sleeve bearing which is provided with a longitudinal opening, a reciprocating spindle slidably mounted in said sleeve bearing and means coupling said spindle and sleeve bearing enabling axial movement of said spindle in said sleeve bearing and independently controlling relative angular movement therebetween.

2. A mechanism as claimed in claim 1 wherein said means consists of a key including bifurcated leg portions, said spindle being provided with an axial groove, one of said leg portions being in said groove and permitting sliding of said spindle with respect to said leg portion, said sleeve bearing having a transverse groove of limited extent engaging the other of said leg portions for permitting angular displacement of said other leg portion between a first and second position, said one leg portion being substantially equal in width to the axial groove of said spindle whereby the same are rotatively coupled.

3. A mechanism as claimed in claim 2 comprising resilient means between said spindle and said carrier lever urging said spindle and carrier lever apart.

4. A change-speed gear mechanism of the type which is operable by chain displacement, said gear mechanism comprising: a carrier lever, said carrier lever including a sleeve bearing which is provided with a longitudinal opening, a reciprocating spindle slidably mounted in said sleeve bearing, means coupling said spindle and sleeve bearing enabling axial movement of said spindle in said sleeve bearing, and independently controlling relative angular movement therebetween, and adjustable plate abutment means in said carrier lever coupled to said reciprocating spindle to regulate the displacement of said reciprocating spindle.

References Cited in the file of this patent

UNITED STATES PATENTS

| 2,400,633 | Derungs | May 21, 1946 |
| 2,428,166 | Letourneur | Sept. 30, 1947 |
| 2,689,756 | Carlson | Sept. 21, 1954 |
| 2,693,116 | Juy | Nov. 2, 1954 |
| 2,773,398 | Swain | Dec. 11, 1956 |
| 2,839,939 | Juy | June 24, 1958 |
| 2,852,289 | Vanderburg | Sept. 16, 1958 |

FOREIGN PATENTS

| 920,463 | France | Jan. 4, 1947 |